United States Patent

Tokuyama et al.

[11] Patent Number: 4,553,196
[45] Date of Patent: Nov. 12, 1985

[54] POWER SOURCE SYSTEM FOR VEHICULAR ELECTRONIC DEVICE

[75] Inventors: Keiichi Tokuyama; Shotaro Naito; Shizuhisa Watanabe, all of Katsuta, Japan

[73] Assignee: Hitachi, Ltd., Tokyo, Japan

[21] Appl. No.: 466,340

[22] PCT Filed: Jun. 9, 1982

[86] PCT No.: PCT/JP82/00223
§ 371 Date: Feb. 1, 1983
§ 102(e) Date: Feb. 1, 1983

[87] PCT Pub. No.: WO82/04487
PCT Pub. Date: Dec. 23, 1982

[30] Foreign Application Priority Data

Jun. 12, 1981 [JP] Japan .................. 56-89621

[51] Int. Cl.$^4$ .................................. H02M 3/335
[52] U.S. Cl. ............................. 363/21; 363/61
[58] Field of Search ........... 307/9, 10 R; 363/18, 363/19, 20, 21, 59, 60, 61, 101; 323/259, 344, 908, 299, 303; 320/13

[56] References Cited

U.S. PATENT DOCUMENTS

| 2,920,259 | 1/1960 | Light | 363/18 |
| 4,224,659 | 9/1980 | Iguchi | 363/20 |
| 4,246,635 | 1/1981 | Arima | 363/101 |
| 4,315,208 | 2/1982 | McElroy et al. | 363/101 |

FOREIGN PATENT DOCUMENTS

| 54-143027 | 11/1979 | Japan | 320/13 |
| 55-37879 | 3/1980 | Japan | 363/19 |
| 55-127883 | 10/1980 | Japan | 363/19 |
| 57-90729 | 6/1982 | Japan | 363/303 |

Primary Examiner—Peter S. Wong
Assistant Examiner—Judson H. Jones
Attorney, Agent, or Firm—Antonelli, Terry & Wands

[57] ABSTRACT

Herein disclosed is a vehicular power source system which uses as its load a memory-arithmetic circuit (5) such as a microcomputer.

An electric power is supplied to the load (5) through a diode (6) and a constant voltage circuit (4), when a switch (2) for running the vehicle is open, but a booster (3) is operated to supply the power when the switch (2) is turned on.

The voltage drop of a battery (1), which may be caused during the running operation of the vehicle, is not transmitted to the load (5), but a constant voltage is supplied to the load (5) at all times so that the storage data of the memory unit (5) is always held.

8 Claims, 4 Drawing Figures

POWER SOURCE SYSTEM FOR VEHICULAR ELECTRONIC DEVICE

DESCRIPTION

1. Technical Field

The present invention relates to a power source system for vehicles and, more particularly, to a power source system for a vehicular electronic device, which is equipped with memory-arithmetic units such as a microcomputer.

2. Background Art

Recent automobiles are being equipped with electronic devices, which are required to store and hold data, such as clocks or trip computers. In an electronic device having built therein a memory unit for storing data, if a voltage to be applied for operating an electronic device is blocked or dropped to a level lower than a predetermined value, the storage data held in the memory unit until that block or drop in voltage is lost so that the electronic device which relies for its operation on that data may possibly malfunction or be rendered inoperative. If a clock exemplifies that electronic device, it may indicate an improper time. If a trip meter is another example, it may improperly indicate a running distance, a runnable distance and/or an elapse time.

In the system thus far described, a serious problem for causing the storage data of the memory unit to be lost is a drop of the terminal voltage of a battery at the time of start of the engine. The voltage to be applied to a microcomputer is generally required to be held at about $5\pm0.5$ [V]. For this requirement, the applied voltage is held constant by the action of a constant voltage circuit. If the battery terminal voltage ranges from 6 to 20 [V], the required voltage is ensured in a normal manner so that the voltage to be applied to the microcomputer is held at about $5\pm0.5$ [V]. At the time of start of the engine, however, especially when the engine is started at the time when the ambient temperature is low, the battery terminal voltage is frequently dropped to a level lower than 5 [V] to invite a state in which the voltage to be applied to the microcomputer becomes too low so that the storage data cannot be held. In order to eliminate such problem, there has been adopted in the prior art a method by which the power source is backed up by means of a battery or by which a DC-DC converter is used at all times to boost the voltage. The former method has a defect in that it is required to retain a space for arranging the battery or to maintain the battery. The latter method has a defect that, since the DC-DC converter is operating even when the engine is stopped, the discharge of the battery is so increased that not only the engine cannot be started but also the storage data is lost if the automobile is left as it is for a long time.

DISCLOSURE OF INVENTION

One object of the present invention is to provide a power source system for a vehicular electronic device, which is free from the aforementioned defects while having its power consumption reduced.

Another object of the present invention is to provide a power source system which is able to reliably hold the storage data of a memory unit to be built in a vehicular electronic device.

Still another object of the present invention is to provide a power source system for a vehicular electronic device, which is small, light and inexpensive.

The present invention is characterized in that the power source system of a vehicular electronic device is equipped with control means for controlling a booster circuit. By the action of this control means, the terminal voltage of the battery is applied to the electronic device, without being boosted by the booster circuit, in case the load upon the battery is limited to the electronic device including a memory unit, i.e., in case an ignition switch is left open. As a result, the power to be consumed in the booster circuit can be reduced to reduce the discharge of the battery.

BEST MODE FOR CARRYING OUT THE INVENTION

The embodiments of the present invention will be described in detail in the following with reference to the accompanying drawings.

Figure 1:
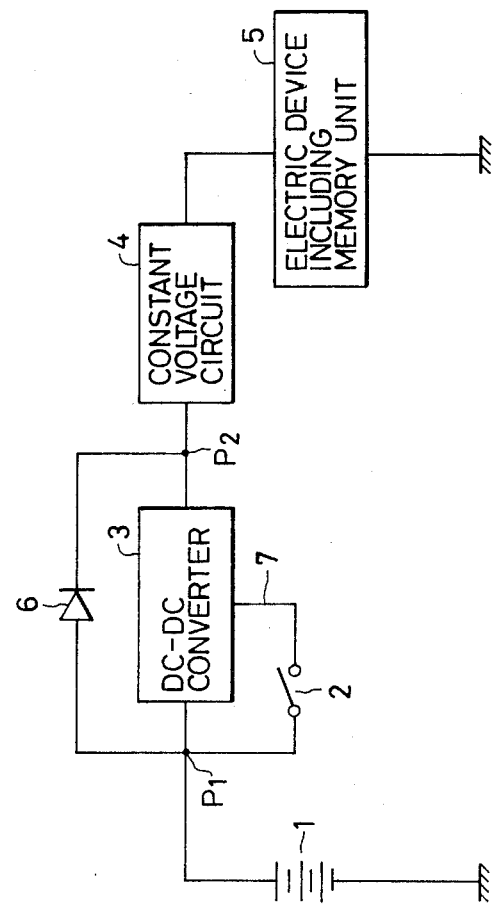
FIG. 1 is a block diagram showing an embodiment of the present invention.

FIG. 1 is a block diagram showing one embodiment of the power source system of a vehicular electronic device according to the present invention. In FIG. 1, the main voltage of a battery 1 is applied to an ignition circuit system (although not shown) by closing an ignition switch 2. When the ignition switch 2 is closed, moreover, the aforementioned voltage of the battery 1 is boosted by a DC-DC converter 3 and is then applied to a constant voltage circuit 4, the output voltage of which is fed to an electronic device 5 having a memory unit built therein. When the ignition switch 2 is open, on the other hand, the DC-DC converter 3 is left inoperative so that the voltage of the battery 1 is not boosted but applied to the input terminal of the constant voltage circuit 4 through a diode 6. The DC-DC converter 3 also has a function to hold the voltage constant so that its output voltage is substantially constant, e.g., about 8 [V] when the ignition switch 2 is left closed. When the voltage of the battery 1 is at 12 [V], the potential at a point $P_2$ is at about 11 [V] if the diode 6 has a forward voltage drop of about 1 [V]. Since the output voltage of the DC-DC converter 3 is at about 8 [V], on the other hand, a voltage of about 11 [V] is then applied to the input terminal of the constant voltage circuit 4. The voltage of the battery 1 is boosted, when it is dropped to a level, e.g., 5 [V], to about 8 [V] by the action of the DC-DC converter 3, but the diode 6 is left non-conductive so that the voltage of about 8 [V] is applied to the input terminal of the constant voltage circuit 4. As a result, the voltage to be applied to the input terminal of the constant voltage circuit 4 is held at a level higher than about 8 [V] so that the output voltage of the constant voltage circuit 4, i.e., the voltage to be fed to the electronic device 5 having the memory unit built therein is held at a proper level. When the ignition switch is open, the load to be connected to the battery 1 is limited to the electronic device 5 having the memory device, and the electronic device of that kind has a small power consumption. As a result, no drop of the voltage of the battery 1 is caused if the load is high. At this time, therefore, the DC-DC converter 3 is not operated, but the voltage of the battery 1 is applied to the input terminal of the constant voltage circuit 4 through the diode 6. These operations are realized by equipping the power source system with both a control terminal 7 for controlling the DC-DC converter 3 and the diode 6.

With the construction thus far described, the supply voltage to the electronic device 5 having the memory unit is maintained at about 5±0.5 [V] even if the load is abruptly increased with the ignition switch 2 being closed, e.g., even if the engine starter starts so that the voltage of the battery 1 is dropped to a level lower than about 5 [V]. When the ignition switch 2 is open, the power consumption can be reduced to about one fortieth as high as that of the prior art.

Figure 2:
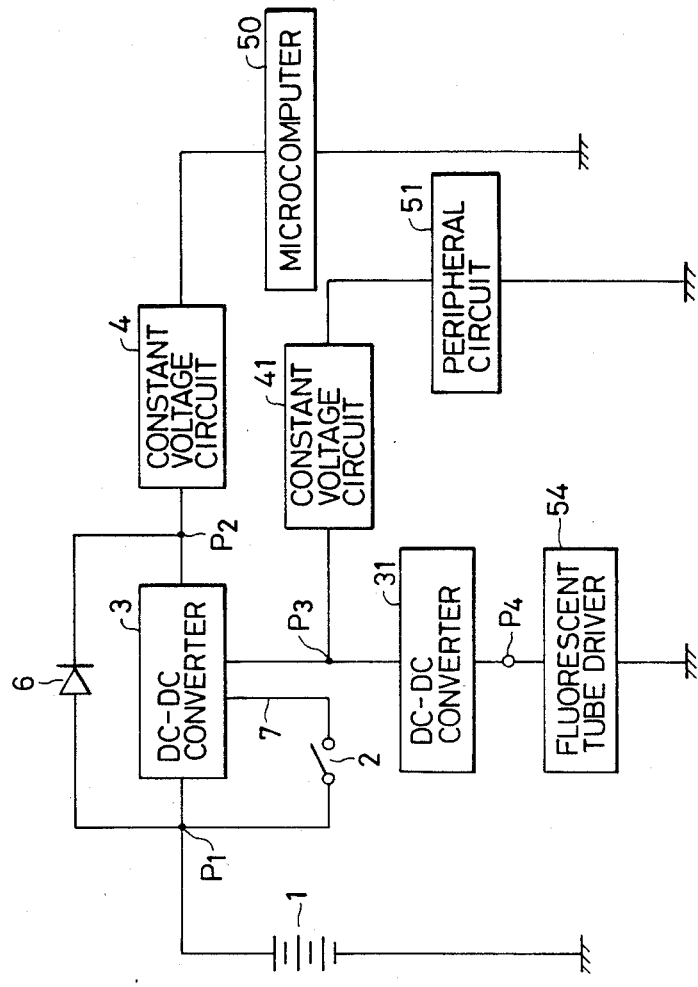
FIG. 2 is a block diagram showing another embodiment of the present invention.

FIG. 2 is a block diagram showing another embodiment of the power system of a vehicular electronic device according to the present invention. Parts designated at the same reference characters as those of FIG. 1 indicate the same units or devices. The electronic device 5 shown in FIG. 1 to have the memory unit is generaly divided roughly into a microcomputer 50 having storing and computing functions, a peripheral circuit 51 of the microcomputer 50, and a fluorescent tube driver 54 which is made operative to drive a fluorescent tube for displaying the storage data or the computed result. It is only the microcomputer 50 having the memory function that should be supplied with the voltage at all times. It is sufficient to supply the peripheral circuit 51 and the fluorescent tube driver 54 with the required voltage only during the running operation of the vehicle, i.e., while the ignition switch 2 is closed. FIG. 2 is a block diagram showing the construction for accomplishing that supply of power. As shown in FIG. 2, the microcomputer 50 is supplied through the diode 6 with the voltage of the battery 1 even when the ignition switch 2 is left open, i.e., when the DC-DC converter 3 is not operated. On the other hand, the peripheral circuit 51 and the fluorescent tube driver 54 are supplied with that voltage when the ignition switch 2 is closed. The output voltage of the DC-DC converter 3 is supplied through a constant voltage circuit 41 to the peripheral circuit 51. On the other hand, the drive of the fluorescent tube requires a voltage higher than the voltage of the battery, e.g., about 40 [V]. For this requirement, the output voltage of the DC-DC converter 3 is boosted by a DC-DC converter 31 having a large capacity and is supplied to the fluorescent tube driver 54. With this construction, the electronic circuit other than the microcomputer 50 consumes no electric power when the ignition switch 2 is open, so that the discharge of the battery can be restricted to a remarkably low extent even if the vehicle is left undriven.

Figure 3:
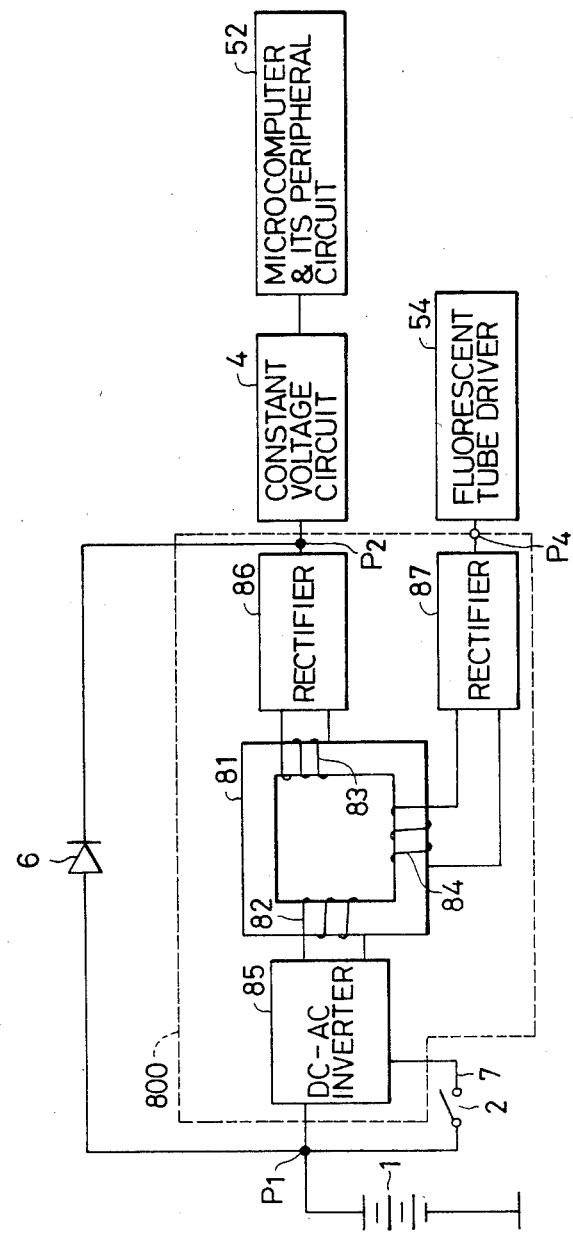
FIG. 3 is a block diagram showing still another embodiment of the present invention.

FIG. 3 is a block diagram showing still another embodiment of the power source system of a vehicular electronic device according to the present invention. In the boosting DC-DC converter, there is used a transformer for the voltage conversion. Although the two DC-DC converters are used in the embodiment of FIG. 2, they can be replaced by a single one if they have their transformer cores shared inbetween. In FIG. 3, a DC-DC converter 800 is integrated from the DC-DC converters 3 and 4 shown in FIG. 2. In the DC-DC converter 800, there is built a trans-core 81, on which are wound a primary winding 82 and two secondary windings 83 and 84. With the primary winding 82, there is connected a DC-AC inverter 85 which has the control terminal 7. When the ignition switch 2 is closed, the DC-AC inverter 85 operates to invert the d.c. voltage of the battery 1 into an a.c. voltage, which is applied to the primary winding 82. The a.c. voltage to be induced in the secondary winding 83 is rectified by a rectifier 86 into a d.c. voltage, which is supplied through the constant voltage circuit 4 to the microcomputer and its peripheral circuit 52. The secondary winding 84 has a larger number of turns than the secondary winding 83 so as to induce therein an a.c. voltage sufficient for driving the fluorescent tube. This a.c. voltage is rectified by the action of a rectifier 87 into a d.c. voltage, which is supplied to the fluorescent tube driver 54. When the ignition switch 2 is left open, the DC-AC inverter is inoperative. As a result, the DC-DC converter 800 generates no output, but the microcomputer and its peripheral circuit 52 is supplied with the voltage from the battery 1 through the diode 6.

With the construction thus far described, the storage data of the microcomputer can be held with a slight power consumption even when the ignition switch 2 is open, and the DC-DC converter 800 can be made small, light and inexpensive.

Figure 4:
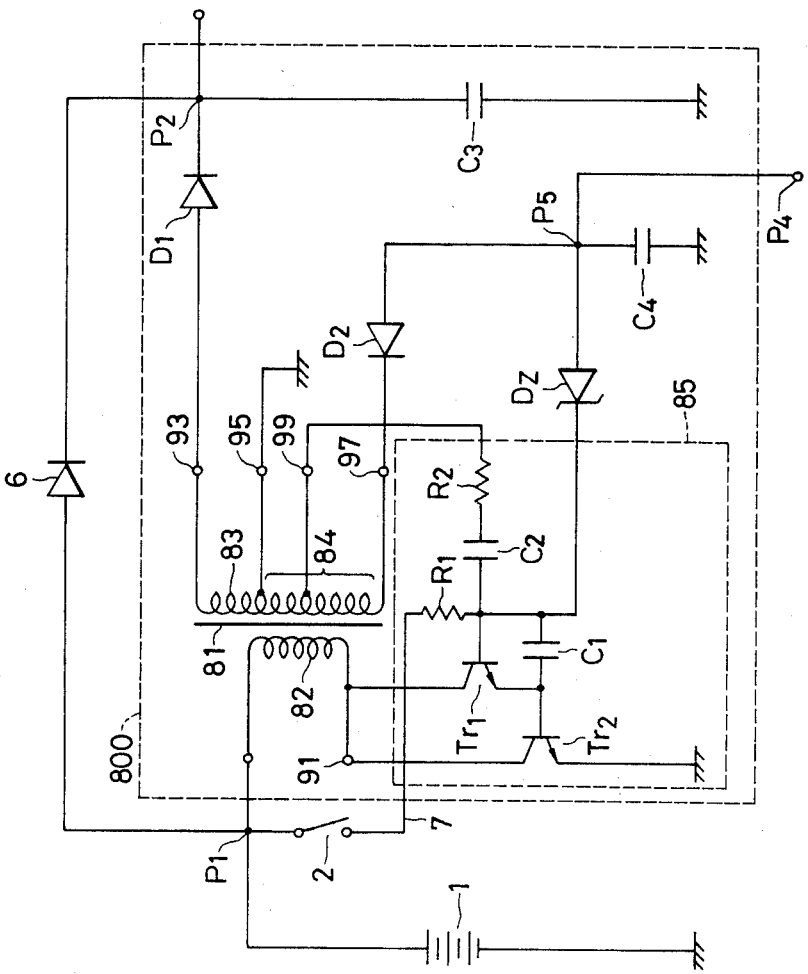
FIG. 4 is a circuit diagram constituting a DC-DC converter of the embodiment of the present invention shown in FIG. 3.

FIG. 4 is one circuit diagram of the DC-DC converter 800 constituting the embodiment of the present invention shown in FIG. 3. In FIG. 4, units or elements designated by the same reference characters as those of FIG. 3 indicate the same unit or elements. The primary winding 82 of the transformer and a transistor $Tr_2$ are connected in series with the battery 1, and a transistor $Tr_1$ is connected between one terminal 91 of the primary winding 82 and the base of the transistor $Tr_2$. A resistor $R_1$ is connected through the ignition switch 2 between the node $P_1$ of the primary winding 82 and the battery 1 and the base of the transistor $Tr_1$. On the other hand, the secondary winding 83 has its one terminal 93 grounded through a diode $D_1$ and a capacitor $C_3$ and its other terminal 95 grounded directly. The secondary winding 84 has its one terminal grounded directly and its other terminal 97 grounded through a diode $D_2$ and a capacitor $C_4$, and a series circuit of a resistor $R_2$ and a capacitor $C_2$ is connected between an intermediate tap 99 and the base of the transistor $Tr_1$. Moreover, a constant voltage diode $D_z$ is connected between the node $P_5$ of the diode $D_2$ and the capacitor $C_4$ and the base of the transistor $Tr_1$. The node $P_2$ is connected to input terminal of the constant voltage circuit 4 whereas the node $P_5$ is connected to the input terminal $P_4$ of the fluorescent tube driver 54. Thus, the diode $D_1$ and the capacitor $C_3$ constitute the rectifier 86 whereas the diode $D_2$ and the capacitor $C_4$ constitute the rectifier 87.

When the ignition switch 2 is closed, a current flows from the battery 1 through the resistor $R_1$ to the bases of the transistors $Tr_1$ and $Tr_2$ so that the transistors $Tr_1$ and $Tr_2$ turn on. The current further flows through the primary winding 82 so that a postive potential is induced in the secondary wiring terminal 93 whereas a negative potential is induced in the wiring terminals 99 and 97. Then, the current made to flow through the resistor $R_1$ by the negative potential at the secondary wiring terminal 99 passes through the capacitor $C_2$ and the resistor $R_2$ to charge up the capacitor $C_2$ so that the base current of the transistor $Tr_1$ disappears to render the transistors $Tr_1$ and $Tr_2$ non-conductive. When these transistors $Tr_1$ $Tr_2$ become non-conductive, no current flows through the primary winding 82, but a voltage is induced in the secondary windings 83 and 84 in a direction to cause the current of the primary winding to continuously flow (i.e., in the polarity opposite to that when the transistors $Tr_1$ and $Tr_2$ are rendered conductive) so that the charges which have been stored in the capacitor $C_2$ are discharged. As a result, the discharge current flows from the secondary winding terminal 99 to the base of the transistor $Tr_1$, and its composed current with the current flowing from the battery 1 through the resistor $R_1$ flows through the bases of the transistors $Tr_1$ and $Tr_2$. As a result, the transistors $Tr_1$ and $Tr_2$ restore their conductive states so that the current begins to flow through the primary winding 82 to establish a positive potential at the secondary winding terminal 93 and negative potentials at the secondary winding terminals 99 and 97. These operations are repeated to generate a.c. voltages at the secondary windings 83 and 84. These a.c. voltages are rectified by the actions of the rectifiers 86 and 87 so that a positive d.c. voltage is obtained at the terminal $P_2$ whereas a negative d.c. voltage is obtained at the terminal $P_5$. Since the secondary windings 83 and 84 have a larger number of turns than that of the primary winding 82, the d.c. voltages to be induced at the secondary windings 83 and 84 are higher than that at the primary winding 82. As a result, the d.c. voltage of the battery 1 is converted into a higher d.c. voltage. On the other hand, the potential at the node $P_5$ connected with the input terminal $P_4$ of the fluorescent tube driver is depressed to a certain level (e.g., $-40$ [v]) by the action of the constant voltage diode Dz. The potential at the node $P_2$ to the input terminal of the constant voltage circuit 4 is also depressed to a certain level (e.g., 8 [V]) because it is in proportion to that at the node $P_5$. As a result, if the voltage of the battery 1 has a normal value, e.g., about 12 [V] even if the ignition switch 2 being closed, the diode 6 is brought into its conducting state so that a voltage of about 11 [V] is applied to the input terminal of the constant voltage circuit 4. When the voltage of the battery 1 is dropped to about 6 [V], for example, as at the time of start of the engine, the diode 6 is not rendered conductive so that the output voltage of the DC-DC converter 800 is applied to the input terminal of the constant voltage circuit 4. When the ignition switch 2 is open, the transistors $Tr_1$ and $Tr_2$ are held in their non-conducting states so that the DC-DC converter 800 is left inoperative so as to consume no electric power.

With the circuit construction shown in FIG. 4, both the positive d.c. voltage to be applied to the microcomputer and its peripheral circuit 52 and the negative d.c. voltage to be applied to the fluorescent tube driver 54 can be simultaneously generated to make the power source system small, light and inexpensive.

As has been described hereinbefore, according to the present invention, there is provided a power source system which can reliably hold the storage data of an electronic device having storing and computing functions without inviting any increase in the power consumption.

What is claimed is:

1. A vehicular power source system comprising: a battery; a vehicle electrical operating system; and a vehicle ignition switch for selectively connecting said electrical operating system to said battery during the entire time said vehicle is being operated; said electrical operating system including boosting means connected to said battery for boosting the voltage of said battery, a constant voltage circuit connected to said boosting means, control means including said vehicle ignition switch for controlling the operation of said boosting means so that said boosting means is enabled to operate only when said ignition switch is closed, and bypass means connected in parallel with said boosting means between said battery and said constant voltage circuit so that the voltage of said battery is applied through said bypass means to said constant voltage circuit when the battery holds its normal voltage level.

2. A power source system as set forth in claim 1, and wherein said bypass means includes a diode.

3. A vehicular power source system comprising: a battery; a boosting circuit including an input terminal to be supplied with the voltage of said battery, first and second output terminals for supplying the voltage to a load, and a control terminal; bypass means connected between said input terminal and said first output terminal; and an ignition switch connected between said battery and said control terminal so that said boosting circuit is rendered operative, when the voltage of said battery is applied to said control terminal upon closing their ignition switch, to generate voltages at said first and second output terminals, respectively, and said boosting circuit is left inoperative, when no voltage is applied to said control terminal as a result of the ignition switch being open, the voltage of said battery being generated only at said first output terminal through said bypass means when said ignition switch is open.

4. A vehicular power source system as set forth in claim 3, wherein said load is an electric device including a memory unit.

5. A vehicular power source system comprising: a battery; a boosting circuit including an input terminal to be supplied with the voltage of said battery, first and second output terminals for supplying the voltage to a load, and a control terminal; and bypass means connected between said input terminal and said first output terminal, wherein said boosting circuit is rendered operative, when the voltage of said battery is applied to said control terminal, to generate voltages at said first and second output terminals, respectively, and wherein said boosting circuit is left inoperative, when no voltage is applied to said control terminal, but the voltage of said battery is generated only at said first output terminal through said bypass means.

6. A vehicular power source system as set forth in claim 5, wherein said boosting circuit includes: a d.c./a.c. converter having an input terminal connected with said battery, a control terminal and an output terminal; a first rectifier having output and input terminals connected with the first-mentioned output terminal; a second rectifier having output and input terminals connected with the second-mentioned output terminal; and a transformer having a primary winding connected with the output terminal of said d.c./a.c. converter, a first secondary winding connected with the input terminal of said first rectifier, and a second secondary winding connected with the input terminal of said second rectifier, wherein said d.c./a.c. converter is driven, when the voltage of said battery is applied to the control terminal thereof, so that it is rendered operative to generate voltages at said first and second output terminals.

7. A vehicular power source system as set forth in claim 5, wherein said load which is connected to said first output terminal is an electric device including a memory unit.

8. A vehicular power source system as set forth in claim 6, wherein said load which is connected to said first output terminal is an electric device including a memory unit.

* * * * *